United States Patent
Ichikawa

(10) Patent No.: US 8,802,223 B2
(45) Date of Patent: Aug. 12, 2014

(54) DECORATED SHEET AND MOLDED ARTICLE INTEGRATED WITH THE SAME

(75) Inventor: Osamu Ichikawa, Tokyo (JP)

(73) Assignee: Teikoku Printing Inks Mfg. Co. Ltd., Tokyo (JP)

( * ) Notice: Subject to any disclaimer, the term of this patent is extended or adjusted under 35 U.S.C. 154(b) by 1220 days.

(21) Appl. No.: 11/872,145

(22) Filed: Oct. 15, 2007

(65) Prior Publication Data

US 2009/0098349 A1   Apr. 16, 2009

(51) Int. Cl.
*B32B 3/10*    (2006.01)
(52) U.S. Cl.
USPC ........... 428/204; 428/203; 428/207; 428/354; 428/355 EN
(58) Field of Classification Search
CPC ............... B29C 45/14688; B29C 45/14811; C09D 11/00; B32B 27/00; B44C 1/1704
USPC ............................ 428/203, 204, 354, 355 EN
See application file for complete search history.

(56) References Cited

U.S. PATENT DOCUMENTS

| | | | |
|---|---|---|---|
| 5,635,282 A | | 6/1997 | Suess et al. |
| 5,714,231 A | * | 2/1998 | Reinhart ................. 428/156 |
| 5,798,161 A | * | 8/1998 | Kita et al. ................ 428/64.1 |
| 6,428,875 B1 | * | 8/2002 | Takahashi et al. ......... 428/172 |
| 2003/0096907 A1 | * | 5/2003 | Shiraishi et al. ........... 525/56 |
| 2004/0108048 A1 | | 6/2004 | Nakakuki et al. |
| 2006/0237135 A1 | * | 10/2006 | Sakaguchi et al. ......... 156/334 |
| 2007/0184250 A1 | * | 8/2007 | Saito ....................... 428/206 |

FOREIGN PATENT DOCUMENTS

| | | |
|---|---|---|
| EP | 0510266 A1 | 10/1992 |
| JP | 2001-225347 A | 8/2001 |
| JP | 2003-191398 A | 7/2003 |
| JP | 2004-160851 A | 6/2004 |

OTHER PUBLICATIONS

European Search Report dated Jul. 15, 2008, issued in corresponding European Patent Application No. 07118019.4.
Japanese Office Action dated Apr. 22, 2008 issued in corresponding Japanese Patent Application No. 2006-140458.

* cited by examiner

*Primary Examiner* — Gerard Higgins
*Assistant Examiner* — Sathavaram I Reddy
(74) *Attorney, Agent, or Firm* — Westerman, Hattori, Daniels & Adrian, LLP

(57) ABSTRACT

There is provided a decorated sheet having a good adhesiveness with a molding resin regardless of a pattern of a colored part. A decorated sheet comprising: a transparent layer coating on the entire surface of a thermoplastic substrate sheet or at least in the areas of said substrate sheet having no coloring layer formed, said transparent layer coated by a transparent ink with as common varnish composition as the ink for coloring layer formation, and an adhesive layer formed as the outermost layer of said decorated sheet on the side provided with the colored layers of the substrate sheet. A molded article is fabricated by integrating the decorated sheet with a molding resin.

10 Claims, 4 Drawing Sheets

DECORATED SHEET AND MOLDED ARTICLE INTEGRATED WITH THE SAME

CROSS-REFERENCE TO RELATED APPLICATIONS

This application is based upon and claims the benefit of priority from prior Japanese Patent Application No. 2006-140458, filed May 19, 2006, the entire contents of which are incorporated herein by reference.

BACKGROUND OF THE INVENTION

1. Technical Field

The present invention relates to a decorated sheet integrated at the time of molding with a printing material that has previously been printed on the surface of a synthetic resin, an ink used for manufacturing the decorated sheet, and an injection molded article integrated with the decorated sheet.

2. Related Art

Among processes to apply decorations onto the surface of a synthetic resin molded article, there is known a synthetic resin molding process (hereinafter often referred to as a film insert molding process) in which a printing material such as a synthetic resin sheet or film that has previously been printed by ink (hereinafter often referred to as a decorated sheet) is loaded in a mold, and a synthetic resin is injected into the mold for integration with the decorated sheet.

This process has one feature of being capable of applying decorations even on molded article that encounters difficulty in application of direct coloration, patterning, etc. by printing on a surface of the molded article. Another advantage is that since a printed layer formed on the decorated sheet can be held in close contact between the synthetic resin molded article and a substrate sheet or film of the decorated sheet, much better scratch resistance is achievable as compared with printing processes for the surfaces of molded articles, and the resulting decorated article is less likely to change with time. Thus, this process is used for application of decorations onto the surfaces of various equipments inclusive of not only small electronic equipment such as cellular phones and PCs, but also various electric appliances and automobile parts.

Conventionally, in the film insert molding process, various proposals have been submitted to improve mutual adhesiveness among a sheet forming a decorated layer, a colored layer forming ink and a synthetic resin filled for molding when forming colored layers by printing.

In JP-A-2003-285404, for example, it is proposed to improve adhesiveness with a polypropylene resin by providing two or more anchor layers and an adhesive layer of a specified composition after having formed colored layers on a thermoplastic resin sheet by printing.

However, by the film insert molding process, there are formed various molded article products such as those having corrugated surfaces and discontinuous decorated layers.

For such molded articles, it is sometimes insufficient that only the adhesiveness between the substrate of a decorated sheet and colored layers or adhesiveness between the colored layers and a molding resin is taken into consideration. For a decorated film that has refined design by both of the color of the molding resin and the decorated layer, for example, there is sometimes a problem that there exist many areas where no colored layer is formed and that in such areas, adhesiveness between the decorated film and the molding resin becomes insufficient, thereby separating the decorated film from the resin depending on its shape.

It is an object of the present invention to provide a decorated sheet having a high adhesive strength between the decorated sheet and a molding resin regardless of the shapes of printing images formed on the decorated sheet and the shapes of molded articles, causing no peeling and having a good weather resistance and to provide molded articles using the decorated sheet.

SUMMARY

The object of the present invention can be attained by a decorated sheet in which colored layers are formed by printing onto a substrate sheet comprising a thermoplastic resin. A decorated sheet comprising: a transparent layer coating on the entire surface of a thermoplastic substrate sheet or at least in the areas of said substrate sheet having no coloring layer formed, said transparent layer coated by a transparent ink with as common varnish composition as the ink for coloring layer formation, and an adhesive layer formed as the outermost layer of said decorated sheet on the side provided with the colored layers of the substrate sheet.

Further, on the decorated sheet, there are formed colored layers after a transparent layer has been formed thickly on the surface of the substrate sheet.

On the decorated sheet, there is formed a transparent layer at least in areas where no colored layers exist after colored layers have been formed on the substrate sheet.

On the decorated sheet, the substrate sheet is made of polycarbonate.

On the decorated sheet, the substrate sheet comprises a thermoplastic resin for which colored-layer-easily-adhesive treatment or easy adhesion layer formation has been performed.

Moreover, there is provided a molded article fabricated by integrating a decorated sheet via an adhesion layer with a synthetic resin by film insert molding. A decorated sheet comprising: a transparent layer coating on the entire surface of a thermoplastic substrate sheet or at least in the areas of said substrate sheet having no coloring layer formed, said transparent layer coated by a transparent ink with as common varnish composition as the ink for coloring layer formation, and an adhesive layer formed as the outermost layer of said decorated sheet on the side provided with the colored layers of the substrate sheet.

Further, in the molded article, the decorated sheet is a sheet on which colored layers are formed after a transparent layer has been formed thickly on the surface of the substrate sheet.

In the molded article, the decorated sheet is a sheet on which a transparent layer is formed at least in areas where no colored layer exists after colored layers have been formed on the substrate sheet.

In the molded article, the substrate sheet comprises polycarbonate and the integrated synthetic resin contains at least one of polypropylene or polyamide.

In the molded article, the substrate sheet comprises polypropylene on which coloring-layer-easily adhesive treatment or easily adhesive layer formation has been performed and the integrated synthetic resin contains at least polypropylene or polyamide.

The decorated sheet of the present invention has a uniform adhesiveness on its surface regardless of whether or not colored layers are formed because there is formed a transparent ink layer having the same varnish composition as a coloring ink used for forming the colored layers in areas where no colored layers are formed on the substrate sheet. Therefore, the decorated sheet of the present invention can provide a molded article having a good adhesiveness with a molded article integrated with a synthetic resin without depending on the area of colored layers, designs, shapes of a decorated sheet surface or the like.

BRIEF DESCRIPTION OF DRAWINGS

The invention will be described with reference to the accompanying drawings, wherein like numbers reference like elements.

DESCRIPTION OF EXAMPLARY EMBODIMENTS

Figure 1A:
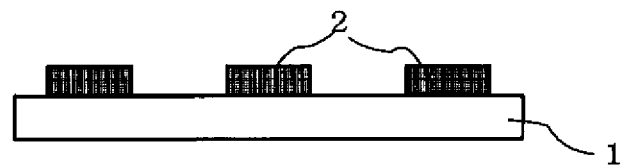
FIGS. 1A to 1D are cross-sectional views illustrating a first decorated sheet and a first molded body integrated with the decorated sheet.

The present invention has focused attention on the fact that for molded articles formed by film insert molding using a decorated sheet on which a decorated layer is formed by printing, adhesiveness between a substrate sheet and an adhesion layer affects the case where an ink having a good adhesiveness with the substrate sheet and the adhesion layer is used as a colored layer forming ink, that the peeling strength against a synthetic resin integrated with the decorated sheet is affected by the shapes, sizes or the like of printing patterns formed on the decorated layer, and that the peeling strength against a molded article becomes insufficient particularly in areas where no colored layers are formed by a printing ink.

Thus, it was found out that the peeling strength between the decorated sheet and the synthetic resin could be improved by forming a transparent layer with a transparent ink having the same varnish composition as an ink used for printing colored layers in areas where no colored layers are formed.

The printing ink forming images on the decorated sheet by printing is prepared by mixing varnish having a good adhesiveness with polycarbonate, a surface treatment polyester sheet or the like generally used as a substrate of the decorated sheet with color materials, for example, by mixing varnish prepared from polyester polyol resin with predetermined color materials.

In film insert molding, after having formed the colored layers by printing, the decorated sheet is loaded in a mold as it is or after forming further an adhesion layer to inject a synthetic resin such as polycarbonate and mold a molded body.

As a colored layer forming printing ink, a varnish is selected in consideration of adhesiveness with the substrate sheet. Further, in consideration of adhesiveness between the molded resin and the colored layers, a material having a good adhesiveness with both of the molded resin and the colored layers is selected as an adhesion layer provided on the colored layers to improve adhesiveness between the synthetic resin and the colored layers.

However, in selecting the respective materials for the substrate sheet, the colored layer ink, the adhesion layer and the synthetic resin used for molding, the adhesiveness between the substrate sheet and the synthetic resin used for molding or the adhesiveness between the substrate sheet and the adhesion layer has never been taken into consideration sufficiently.

Thus, if a decorated layer is not formed on the entire surface of the substrate sheet, the adhesiveness between the decorated sheet and the synthetic resin used for molding becomes insufficient and a molded article having a sufficient peeling strength cannot be sometimes obtained.

In the present invention, in order to improve the adhesiveness between the decorated sheet and the molded synthetic resin, a transparent ink layer may be formed by a transparent ink having the same varnish composition as a colored layer forming printing ink before forming colored layers on the substrate sheet by printing, or a transparent layer may be printed by the transparent ink in areas where no colored layers are formed or on the entire surface of the side on which the colored layers are formed after the colored layers have been formed by the printing ink.

Further, the sequence of forming the colored layers and the transparent layer is not specified, and the colored layers maybe formed after having formed the transparent layer or vice versa. Even if there exist areas where no colored layers are formed on the substrate sheet, the peeling strength between both the colored layers of the substrate sheet and the areas where no colored layers are formed and the molding synthetic resin can be improved, and even if there exist areas where no colored layers are formed on the substrate sheet, the adhesiveness between both of the areas where colored layers are formed on the substrate sheet and the areas where no colored layers are formed and the adhesion layer, and the peeling strength between the adhesion layer and the molding synthetic resin can be both improved.

Further, in the present invention, "formed on the entire surface" means formation on all portions except printing margins inevitably left around the substrate in printing and except peripheral portions unnecessary for a molded article Further, in the present invention, the same varnish composition means that the resins and solvents composing the both varnish compositions have similar or identical properties and a large mutual affinity, but does not mean that the both varnishes are perfectly identical in ingredient and content and means that they have a high affinity even if they are more or less different in mixing ratio and have differences in ingredient except color materials.

That is, for a printing ink mixed with color materials for forming colored layers, more ingredients may be mixed in addition to color materials compared to a transparent ink. Even in such a case, the varnish compositions shall be deemed same as long as the same ingredients are contained as a resin ingredient composing the varnish compositions and a solvent.

The decorated sheet of the present invention and the molded body integrated with the decorated sheet will be described with reference to the accompanying drawings.

FIGS. 1A to 1D are cross-sectional views illustrating a first decorated sheet and a first molded body integrated with the decorated sheet.

Figure 1B:
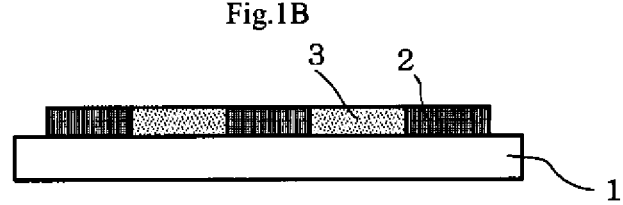
Figure 1C:
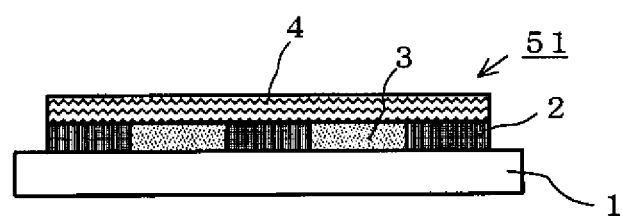

A first decorated sheet 51 can be fabricated by forming a transparent ink layer 3 having the same varnish composition as an ink forming colored layers 2 in areas where no colored layers 2 are formed on a substrate sheet 1 as shown in FIG. 1B after having formed the colored layers 2 by screen printing or the like on the substrate sheet 1 as shown in FIG. 1A and further by forming an adhesion layer 4 on the colored layers 2 and the transparent ink layer 3 as shown in FIG. 1C.

Figure 1D:
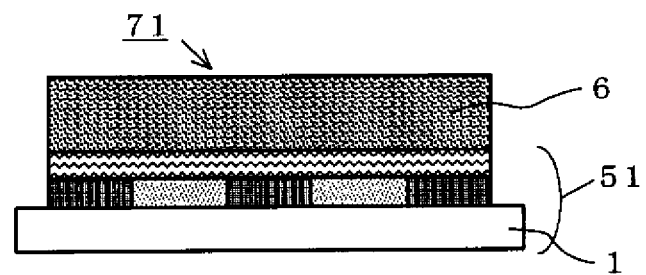

Further, as shown in FIG. 1D, a first molded body 71 can be fabricated by integrating the first decorated sheet 51 with the molding synthetic resin 6 by injection molding.

The first decorated sheet is in contact with the adhesion layer on its entire surface coming into contact with the molding synthetic resin, and further the entire surface of the adhesion layer is in contact with the colored layers or the transparent ink layer having the same varnish composition with the ink composing the colored layers. Thus, both in areas where the colored layers are formed and in areas where no colored layers are formed, a good adhesiveness can be obtained between the substrate sheet and the adhesion layer.

Therefore, when a molded body is fabricated by integrating the first decorated sheet with the resin by insert molding or the like, there can be obtained a molded body of which the decorated sheet has a good adhesiveness.

FIGS. 2A to 2D are cross-sectional views illustrating a second decorated sheet and a second molded body integrated with the decorated sheet.

Figure 2A:
FIGS. 2A to 2D are cross-sectional views illustrating a second decorated sheet and a second molded body integrated with the decorated sheet.
Figure 2B:
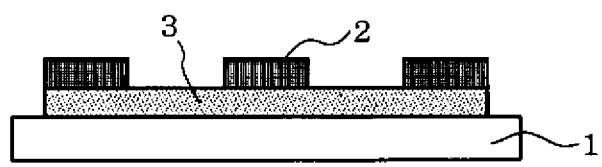

In the second decorated sheet, there are formed colored layers 2 having a predetermined pattern on a thick transparent ink layer 3 as shown in FIG. 2B after having formed the transparent ink layer 3 having the same varnish composition as a colored layer forming ink on a substrate sheet 1 by screen printing or the like as shown in FIG. 2A.

Figure 2C:
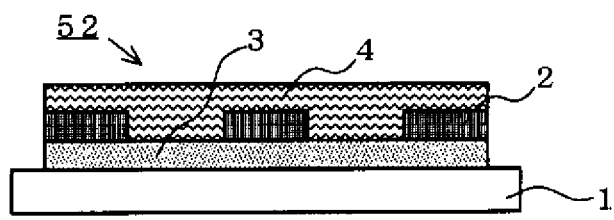

Next, as shown in FIG. 2C, a second decorated sheet 52 can be obtained by forming an adhesion layer 4 on the entire surfaces of the transparent ink layer and the colored layers.

Figure 2D:
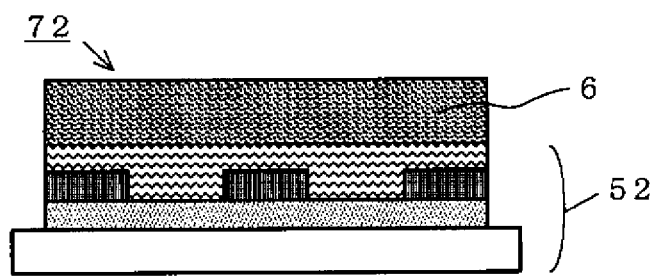

Further, as shown in FIG. 2D, a second molded body 72 can be fabricated by integrating the second decorated sheet 52 with the molding synthetic resin 6 by injection molding.

In the second decorated sheet, there are formed colored layers after having previously formed a transparent ink layer thickly on a surface on which a decorated layer of the substrate sheet is formed. Therefore, the substrate sheet is in contact with the transparent ink layer containing a varnish composition composing the colored layers regardless of whether or not colored layers are formed, thereby obtaining a decorated sheet having a good adhesiveness with a subsequently formed adhesion layer.

As a result, when a molded body is fabricated by integrating the second decorated sheet with the resin by insert molding or the like, there can be obtained a molded body of which the decorated sheet has a good adhesiveness.

FIGS. 3A to 3D are cross-sectional views illustrating a third decorated sheet and a third molded body integrated with the decorated sheet.

Figure 3A:
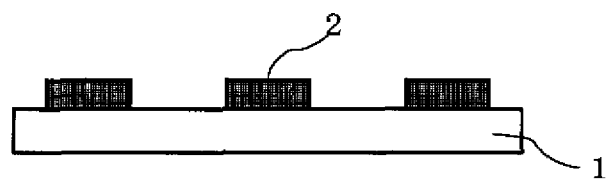
FIGS. 3A to 3D are cross-sectional views illustrating a third decorated sheet and a third molded body integrated with the decorated sheet.
Figure 3B:
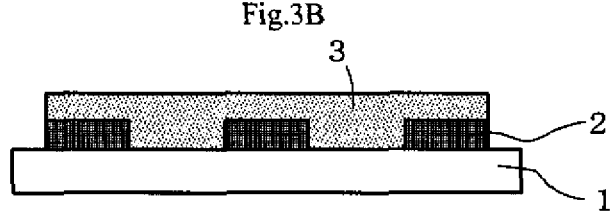
Figure 3C:
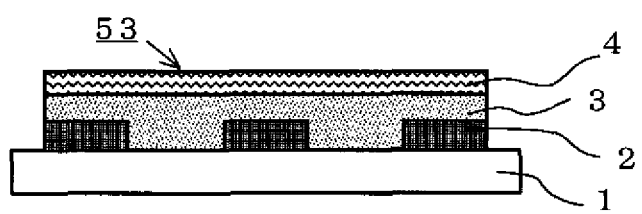

A third decorated sheet 53 is fabricated by forming an adhesion layer 4 as shown in FIG. 3C after having formed colored layers 2 by screen printing or the like on the substrate sheet 1 as shown in FIG. 3A followed by forming a transparent ink layer 3 having the same varnish composition as an ink forming colored layers 2 both in areas where colored layers 2 on a substrate sheet 1 are not formed and in areas where the colored layers 2 are formed as shown in FIG. 3B.

Figure 3D:
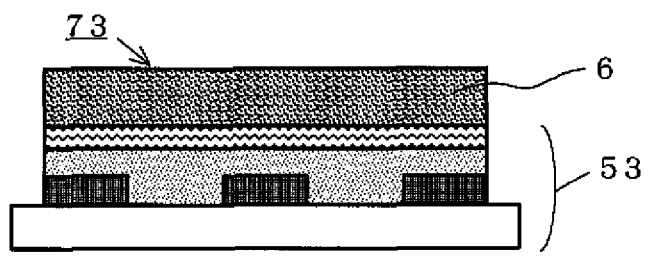

Further, as shown in FIG. 3D, a third molded body 73 can be fabricated by integrating the third decorated sheet 53 with the molding synthetic resin 6 by injection molding.

In the present invention, there can be used, as a substrate of the decorated sheet, thermoplastic sheets that can be processed in three-dimensional shapes.

These substrate sheets may be ones on the surface of which easy adhesion surfaces are formed by physical or chemical treatments or easy adhesion layers are formed by coating applicators or printer in order to improve the adhesiveness with a colored layer forming ink.

Specifically, these substrate sheets may include a vinyl chloride resin, an acrylic resin, a polycarbonate resin, a polycarbonate-polybutylene terephthalate resin, a polyethylene terephthalate resin, a polyester resin, a polypropylene resin A-PET (amorphous polyethylene terephthalate), a polyacrylonitrile resin, or the above-described resins on the surfaces of which an easy adhesiveness treatment is applied or an easy adhesion layer is formed.

Moreover, the thermoplastic sheets have preferably a thickness of 50 to 5000 µm respectively. If the thickness is less than 50 µm, the sheets cannot follow the stretching when being processed in three-dimensional shapes, possibly leading to breaks or wrinkles. On the other hand, if the thickness is more than 5000 µm, the sheets sometimes cannot follow the flexion of a mold, making it difficult to produce a high-precision decorated molded article.

Among the above-described thermoplastic sheets, ones comprising a polycarbonate resin, a polypropylene resin or a vinyl chloride resin are preferable.

When applying a colored layer ink and a transparent layer ink having a good adhesiveness with a polycarbonate resin to a polypropylene sheet, an easy adhesion layer comprising a composition containing an acrylic polyol resin is preferably formed on the surface of the polypropylene sheet.

Specifically, an easy adhesion layer forming composition comprising an acrylic polyol resin may include POS-000 Medium made by Teikoku Printing Inks Mfg. Co., Ltd.

Moreover, as a varnish composition used for forming colored layers or a transparent ink layer, there can be used a varnish composition prepared by dispersing and dissolving at least one selected from the group consisting of resins such as an acrylic resin, an urethane resin, an epoxy resin, a polyester resin, a polyamide resin, a vinyl acetate resin, a phenol resin, olefin, an ethylene-vinyl acetate copolymer resin, a polyvinyl acetal resin, natural rubber, a styrene-butadiene copolymer, an acrylonitrile-butadiene copolymer, a vinyl acetate-acrylic copolymer, an ethylene-ethyl acrylate copolymer, a polyester polyol resin, a polyester polyurethane polyol, a polyether polyurethane polyol and the like in water, alcohols such as isopropyl alcohol, methanol, ethanol or the like, esters such as ethyl acetate or the like, ketones such as methyl ethyl ketons or the like, an aromatic hydrocarbon solvent such as toluene, xylene, solvesso 100, solvesso 150 or the like, or an aliphatic hydrocarbon solvent such as hexane or the like.

Moreover, the varnish composition may contain an isocyanate or amine hardening agent in addition to these resins.

Specifically, the hardening agent can include tolylenediisocyanate (TDI), 4-4' diphenylmethanediisocyanate (MDI), hexamethylenediisocyanate (HDI), isopholonediisocyanate (IPDI), xylylenediisocyanate (XDI) and the like.

Particularly, a varnish composition containing a polyester polyol resin and isocyanate as a hardening agent is preferable.

For inks that can be used for the purpose of the present invention, the inks of various colors of the IPX Ink Series using a polyester polyol resin and a solvent made by Teikoku Printing Inks Mfg. Co., Ltd. can be used as a colored layer forming ink and a transparent ink.

Moreover, the decorated sheet of the present invention has an adhesion layer. The adhesion layer has a role of improving adhesiveness between colored layers or a transparent ink layer and a synthetic resin forming a molded article, and can be formed from a polyolefin resin or the like by screen printing or the like. Specifically, the adhesion layer can be formed from an ink containing at least one selected from the group consisting of a copolymer of ethylene and maleic anhydride and a maleic anhydride-modified polyolefin resin.

By using such an adhesion layer, there can be fabricated a molded article having a sufficient peeling strength even if polypropylene, polyamide or the like is injection molded.

The copolymer of ethylene and maleic anhydride includes a binary copolymer of ethylene and maleic anhydride and a multicomponent copolymer of ethylene, maleic anhydride and other monomers.

Moreover, the maleic anhydride-modified polyolefin resin includes a resin modified by adding maleic anhydride to the polyolefin resin. The polyolefin resin includes a polyethylene resin, a polypropylene resin and an ethylene-vinyl acetate copolymer. As a maleic anhydride-modified polyolefin resin, a maleic anhydride-modified polyethylene resin and a maleic anhydride-modified polypropylene resin are preferable. Further, polyethylene and polypropylene having a maleic acid modification ratio of 0.3 to 10% and a molecular weight of 10,000 to 150,000 are preferable.

Specifically, the adhesion layer can include the IMB Ink Series comprising maleic acid-modified polyolefin resin and a solvent made by Teikoku Printing Inks Mfg. Co., Ltd.

EXAMPLES

Now, the present inventions will be described with reference to examples and comparative examples.

Example 1

Preparation of Coloring Ink 35 parts by weight of a polyester polyol resin (weight-average molecular weight: 20,000), 25 parts by weight of an aromatic hydrocarbon solvent (solvesso 100), 14 parts by weight of carbon black, 25 parts by weight of an aliphatic hydrocarbon solvent (solvesso 150), 1 part by weight of a silicone antifoaming agent and 10 parts by weight of isocyanate having an NCO-equivalent value of 16.5 were added and mixed uniformly to prepare a coloring ink.

Preparation of Transparent Ink

A transparent ink was prepared similarly to the preparation of the coloring ink except that no carbon black was mixed.

Preparation of Adhesion Layer Ink 10 parts by weight of a maleic acid-modified polypropylene resin (maleic acid-modification ratio: 5.0%; average molecular weight: 100,000), 10 parts by weight of silica powder (number-average particle diameter: 1.0 μm), 40 parts by weight of an aromatic hydrocarbon solvent (solvesso 100), 40 parts by weight of cyclohexanone and 1 part by weight of a silicone antifoaming agent were mixed to prepare an adhesion layer ink.

Fabrication of First Decorated Sheet 1

Figure 4:
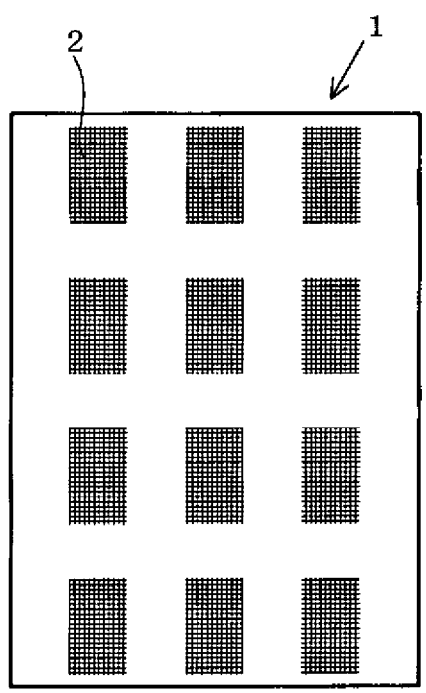
FIG. 4 is a plan view illustrating the pattern of colored layers.

Colored layers 2 of 30 mm in length and 50 mm in breadth were formed at intervals of 30 mm in length and breadth respectively on a polycarbonate substrate of 210 mm in length, 297 mm in breadth and 0.5 mm in thickness (Polyca-Ace EC-100 made by Tsutsunaka Plastics Industry Co., Ltd.) by using a 250-mesh/inch screen printing plate, as a pattern of the colored layers 2 is shown in a plan view in FIG. 4, so that the colored layers 2 might be arranged in 3 rows in breadth and in 4 columns in length and so that the areas around the substrate where no colored layers are formed might have an equal width. Then, the colored layers were dried in a drier at 60° C. for 60 minutes to form colored layers having a film thickness of 6 μm.

Subsequently, the previously prepared transparent ink was applied by a 250-mesh/inch screen printing plate on the areas where no colored layers had been formed. Then, the applied transparent ink was dried in a drier at 60° C. for 60 minutes to form a transparent ink layer having a film thickness of 6 μm.

Further, the previously prepared adhesion layer ink was applied by a 150-mesh/inch screen printing plate on the colored layers and the transparent ink layer. Then, the applied adhesion layer ink was dried in a drier at 60° C. for 60 minutes to fabricate a first decorated sheet sample 1 on which an adhesion layer having a film thickness of 10 μm is formed.

Preparation of First Molded Body Sample 1

The obtained first decorated sheet sample 1 was loaded in a mold of an injection molding machine and polypropylene as a molding synthetic resin (PRIME POLYPRO J707G made by Mitsui Chemicals, Inc; melt flow rate 30 g/10 minutes) was injection molded under the conditions of a resin temperature of 200° C. and a mold temperature of 40° C. to fabricate a first molded body sample 1 by integrating the molding synthetic resin with the first decorated sheet sample 1.

Peeling Test

A test piece of 15 mm in length and 50 mm in breadth was fabricated from the obtained first molded body sample 1. The injection molded resin layer and the decorated sheet were subjected to a 180°-peeling test according to the adhesive-peeling adhesive strength test method of JIS-K6854-2. The result of the test is shown in Table 1.

Example 2

Fabrication of Second Decorated Sheet 2

The previously prepared transparent ink was applied thickly on a polycarbonate substrate of 210 mm in length, 297 mm in breadth and 0.5 mm in thickness (Polyca-Ace EC-100 made by Tsutsunaka Plastics Industry Co., Ltd.) by using a 250-mesh/inch screen printing plate with leaving printing margins. The applied ink was dried in a drier at 60° C. for 60 minutes to form a transparent ink layer having a film thickness of 6 μm.

Subsequently, colored layers 2 of 30 mm in length and 50 mm in breadth were formed at intervals of 30 mm in length and breadth respectively on the substrate sheet, as a pattern of the colored layers 2 is shown in a plan view in FIG. 4, so that the colored layers 2 might be arranged in 3 rows in breadth and in 4 columns in length and so that the areas around the substrate where no colored layers are formed might have an equal width. Then, the colored layers were dried in a drier at 60° C. for 60 minutes to form colored layers having a film thickness of 6 μm.

Further, the previously prepared adhesion layer ink was applied by a 150-mesh/inch screen printing plate on the transparent ink layer. Then, the applied adhesion layer ink was dried in a drier at 60° C. for 60 minutes to fabricate a second decorated sheet sample 2 on which an adhesion layer having a film thickness of 10 μm is formed.

Preparation of Second Molded Body Sample 2

The obtained second decorated sheet sample 2 was loaded in a mold of an injection molding machine and polypropylene as a molding synthetic resin (PRIME POLYPRO J707G made by Mitsui Chemicals, Inc; melt flow rate 30 g/10 minutes) was injection molded under the conditions of a resin temperature of 200° C. and a mold temperature of 40° C. to fabricate a second molded body sample 2 by integrating the molding synthetic resin with the second decorated sheet sample 2.

Peeling Test

The fabricated molded body sample 2 was subjected to the peeling test according to the peeling test method described in Example 1. The result of the test is shown in Table 1.

Example 3

Fabrication of Third Decorated Sheet 3

Colored layers 2 of 30 mm in length and 50 mm in breadth were formed at intervals of 30 mm in length and breadth respectively on a polycarbonate substrate of 210 mm in length, 297 mm in breadth and 0.5 mm in thickness (Polyca-Ace EC-100 made by Tsutsunaka Plastics Industry Co., Ltd.) by using a 250-mesh/inch screen printing plate, as a pattern of the colored layers 2 is shown in a plan view in FIG. 4, so that the colored layers 2 might be arranged in 3 rows in breadth and in 4 columns in length and so that the areas around the substrate where no colored layers are formed might have an equal width. Then, the colored layers were dried in a drier at 60° C. for 60 minutes to form colored layers having a film thickness of 6 μm.

Subsequently, the previously prepared transparent ink was applied by a 250-mesh/inch screen printing plate on the areas where the colored layers had been formed and on the entire surfaces of the areas where the colored layers had been formed with leaving peripheral printing margins. Then, the applied transparent ink was dried in a drier at 60° C. for 60 minutes to form a transparent ink layer having a film thickness of 6 μm.

Further, the previously prepared adhesion layer ink was applied by a 150-mesh/inch screen printing plate on the transparent ink layer. Then, the applied adhesion layer ink was dried in a drier at 60° C. for 60 minutes to fabricate a third decorated sheet sample 3 on which an adhesion layer having a film thickness of 10 μm is formed.

Preparation of Third Molded Body Sample 3

The obtained third decorated sheet sample 3 was loaded in a mold of an injection molding machine and polypropylene as a molding synthetic resin (PRIME POLYPRO J707G made by Mitsui Chemicals, Inc; melt flow rate 30 g/10 minutes) was injection molded under the conditions of a resin temperature of 200° C. and a mold temperature of 40° C. to fabricate a third molded body sample 3 by integrating the molding synthetic resin with the third decorated sheet sample 3.

Peeling Test

A test piece of 15 mm in length and 50 mm in breadth was fabricated from the obtained third molded body sample 3. The injection molded resin layer and the decorated sheet were subjected to a 180°-peeling test according to the adhesive-peeling adhesive strength test method of JIS-K6854-2. The result of the test is shown in Table 1.

Example 4

Fabrication of Fourth Decorated Sheet 4

A fourth decorated sheet sample 4 was fabricated similarly to Example 1 except that a polypropylene sheet of 0.3 mm in thickness (Idemitsu Unitech Co., Ltd.; Pure Ray) was used as a substrate sheet, that a composition mixed uniformly by adding 35 parts by weight of an acrylic polyol resin, 50 parts by weight of an aromatic hydrocarbon solvent (solvesso 150), 1 part by weight of silicone antifoaming agent and 10 parts by weight of isocyanate having an NCO-equivalent value of 16.5 was applied on the entire surface by using a 250-mesh/inch screen printing plate, and that an easy adhesion layer having a film thickness of 6 μm was formed by drying the applied composition in a drier at 60° C. for 60 minutes was formed.

Preparation of Fourth Molded Body Sample 4

The obtained fourth decorated sheet sample 4 was loaded in a mold of an injection molding machine and polypropylene as a molding synthetic resin (PRIME POLYPRO J707G made by Mitsui Chemicals, Inc; melt flow rate 30 g/10 minutes) was injection molded under the conditions of a resin temperature of 200° C. and a mold temperature of 40° C. to fabricate a fourth molded body sample 4 by integrating the molding synthetic resin with the fourth decorated sheet sample 4. The fourth molded body sample 4 was subjected to a peeling test similarly to Example 1. The result of the test is shown in Table 1.

Example 5

The first decorated sheet 1 fabricated similarly to Example 1 was loaded in a mold of an injection molding machine and polyamide as a molding synthetic resin (ALAMINE CM1007 made by Toray Industries, Inc) was injection molded under the conditions of a resin temperature of 200° C. and a mold temperature of 40° C. to obtain a fifth molded body sample 5.

The fabricated molded body sample 5 was subjected to a peeling test that is similar to the peeling test method of Example 1, and the result of the test is shown in Table 1.

Comparative Example 1

Except that adhesion layers were formed both in areas where colored layers were formed and areas where no colored layers were formed after having formed colored layers on the substrate sheet, adhesion layers having a thickness of 10 μm from the colored layers were formed similarly to Example 1 to fabricate a decorated sheet of a comparative sample 1.

A comparative molded body sample 1 was fabricated using the obtained decorated sheet of the comparative sample 1 similarly to Example 1 and subjected to a peeling test that is similar to the peeling test of Example 1. The result of the test is shown in Table 1.

Comparative Example 2

Except that an adhesion layer having a thickness of 10 μm was formed on the substrate sheet, a decorated sheet of a comparative example 2 was fabricated similarly to Example 1.

A comparative molded body sample 2 was fabricated using the obtained decorated sheet of the comparative sample 2 similarly to Example 1 and subjected to a peeling test that is similar to the peeling test of Example 1. The result of the test is shown in Table 1.

TABLE 1

|  | Peeling Strength kN/m |
| --- | --- |
| Example 1 | 2.4 |
| Example 2 | 2.2 |
| Example 3 | 2.4 |
| Example 4 | 2.0 |
| Example 5 | 2.0 |
| Comparative Example 1 | 0.5 |
| Comparative Example 2 | 0.1 |

The decorated sheet of the present invention includes a transparent ink layer having the same varnish composition as colored layers and formed in areas where no colored layers are formed on the substrate sheet. When the decorated sheet is integrated with a synthetic resin after further forming an adhesion layer on these layers, the adhesiveness with the synthetic resin does not depend on the sizes of the areas where colored layers are formed, designs, shapes of the decorated sheet surface or the like, thereby enabling a decorated sheet having a good adhesiveness with synthetic resins and a molded article having therefore a high peeling strength.

What is claimed is:
1. A decorated sheet on which a coloring layer is formed by printing on a substrate sheet made of thermoplastic resin, wherein the decorated sheet comprises:
said substrate sheet;

a transparent layer formed in areas where the coloring layer is not formed or formed on an entire surface of the substrate sheet on a side where said coloring layer is formed, wherein the transparent layer and the coloring layer both comprise a a varnish composition of a polyester polyol based resin and isocyanate; and an adhesive layer formed on both the coloring layer and the transparent layer on the side of the substrate sheet where the coloring layer is formed, wherein the adhesive layer is in direct contact with the coloring layer, and wherein the adhesive layer is made of polyethylene or polypropylene of a molecular weight of 10,000 to 150,000 with a maleic acid modification ratio of 0.3 to 10%.

2. The decorated sheet according to claim 1, wherein the coloring layer is formed after the transparent layer has been formed on the substrate sheet.

3. The decorated sheet according to claim 1, wherein the transparent layer is formed at least in areas where no coloring layer exists after formation of the coloring layer.

4. The decorated sheet according to claim 1, wherein the substrate sheet comprises polycarbonate.

5. The decorated sheet according to claim 1, wherein the substrate sheet comprises a thermoplastic resin for which coloring-layer-easily adhesive treatment or easily adhesive layer formation has been performed.

6. A molded article fabricated by integrating a decorated sheet with a synthetic resin containing at least one of polypropylene or polyamide by film insert molding, the decorated sheet on which a coloring layer is formed by printing on a substrate sheet made of thermoplastic resin, wherein the decorated sheet comprises:

a transparent layer formed in areas where the coloring layer is not formed or formed on an entire surface of the substrate sheet on a side where the coloring layer is formed, wherein the transparent layer and the coloring layer both comprise a varnish composition of a polyester polyol based resin and isocyonate; and an adhesive layer formed on both the coloring layer and the transparent layer on the side of the substrate sheet where the coloring layer is formed, wherein the adhesive layer is in direct contact with the coloring layer, and wherein the adhesive layer is made of polyethylene or polypropylene of a molecular weight of 10,000 to 150,000 with a maleic acid modification ratio of 0.3 to 10%.

7. The molded article according to claim 6, wherein the decorated sheet is a sheet in which coloring layers are formed after the transparent layer has been formed on the substrate sheet surface.

8. The molded article according to claim 6, wherein the decorated sheet is a sheet in which the transparent layer is formed at least in areas where no coloring layer exists after formation of the coloring layer.

9. The molded article according to claim 6, wherein the substrate sheet comprises polycarbonate.

10. The molded article according to claim 6, wherein the substrate sheet comprises polypropylene on which coloring-layer-easily adhesive treatment or easily adhesive layer formation has been performed.

* * * * *